H. W. HILL.
BIFOCAL LENS FUSING.
APPLICATION FILED APR. 14, 1915.
1,199,379.
Patented Sept. 26, 1916.
2 SHEETS—SHEET 1.
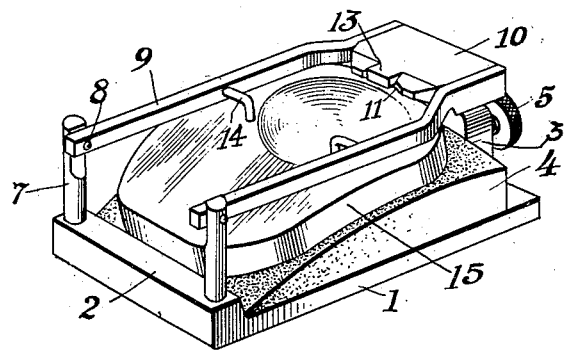
Fig. I
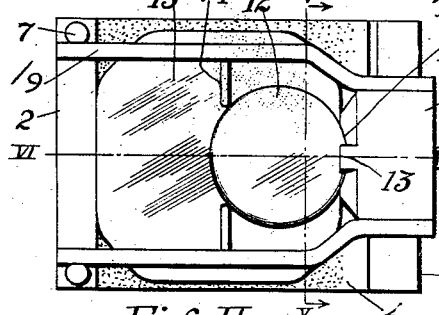
Fig. II
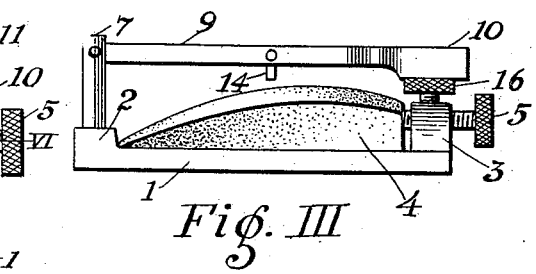
Fig. III
Fig. IV
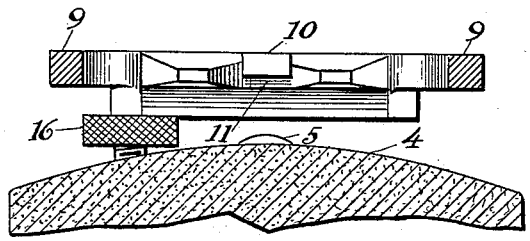
Fig. V
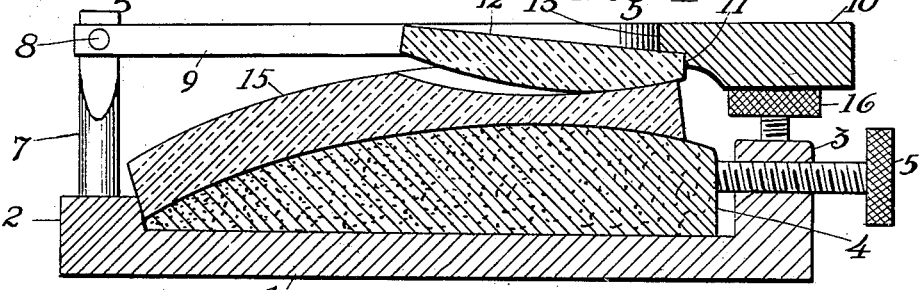
Fig. VI
WITNESSES:
INVENTOR
Harry W. Hill
BY
ATTORNEYS H. W. HILL.
BIFOCAL LENS FUSING.
APPLICATION FILED APR. 14, 1915.
1,199,379.
Patented Sept. 26, 1916.
2 SHEETS—SHEET 2.
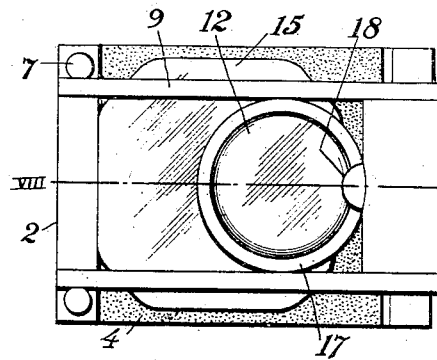
Fig. VII
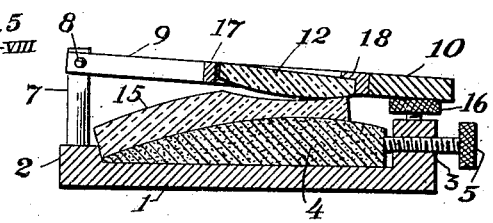
Fig. VIII
WITNESSES:
INVENTOR
Harry W. Hill
BY
ATTORNEYS

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BIFOCAL-LENS FUSING.

1,199,379.

Specification of Letters Patent. Patented Sept. 26, 1916.

Application filed April 14, 1915. Serial No. 21,441.

*To all whom it may concern:*

Be it known that I, HARRY W. HILL, a citizen of the United States, residing at Southbridge, in the county of Worcester and State of Massachusetts, have invented certain new and useful Improvements in Bifocal-Lens Fusing, of which the following is a specification.

This invention relates to improvements in devices for holding the segments or wafers of bifocal lenses in position upon the lens blanks during their fusing operation.

The principal object of the invention is to provide a device of this character which will so hold the segments on the lens blanks during their fusing operation as to prevent the formation of air bubbles and insure a perfect fusion between the segment and the lens blanks, whereby the entire area of the fused lenses may be utilized in the formation of the finished lenses.

Other objects are to provide means for positively preventing any lateral movement of the segments upon the lens blanks; to provide adjustable means for limiting the movement of the segment holding means so that when the lens blanks are softened under the action of heat the holding means will not come into engagement with the fused lens; to provide a base or support for the lens blank, and to provide means for locking the support in a fixed position relative to the segment holding means, and to so construct the entire device that the lens blanks are readily and easily placed therein and removed.

With these and other objects in view the invention consists in the novel features of construction, combination and arrangement of parts as will be hereinafter more fully described, illustrated in the accompanying drawings, and claimed.

In the drawings: Figure I is a perspective view of the complete device. Fig. II is a top plan view. Fig. III is a side elevation. Fig. IV is an end view. Fig. V is a transverse section on the line V—V of Fig. II. Fig. VI is a central longitudinal sectional view. Fig. VII is a plan view of the device illustrating a modified form of segment holding means. Fig. VIII is a central longitudinal sectional view through the structure illustrated in Fig. VII.

Referring to the drawings by numerals, and more particularly to Figs. I to VI inclusive, 1 designates the base of the device which is formed from any desirable or preferred material, and which is preferably rectangular in shape. This base is provided at one end with an upstanding flange 2 and at its opposite end with an upstanding boss or lug 3, the said flange and boss being adapted to receive therebetween the substantially rectangular shaped lens supporting member 4 which has the lower face thereof flat and resting upon the upper face of the base 1, and which has the upper face thereof shaped to the contour of the lens which is adapted to be supported thereon. A set screw 5 is threaded into an opening in the boss 3 and has the inner end thereof engaging the edge of the support 4 in order to lock the same to the base. By this structure it will be seen that by loosening the set screw 5 the support 4 may be readily removed from the base and a new one substituted, whereby lenses of various contours may be used in the machine.

Uprights or pivot posts 7 are carried by the flange 2 near the longitudinal edges of the base 1, and have inwardly extending pins 8 formed near the upper ends thereof on which are pivotally mounted the ends of the bars 9. The bars 9 extend in spaced parallel relation from the post 7 and are disposed in alinement with the longitudinal edges of the base 1. Near their opposite ends these bars are bent inwardly and again extended in parallel relation to receive therebetween the weighted member 10. This member 10 may be formed as an integral part of the bars 9, or may be secured therebetween in any desired or preferred manner.

In the fusing of bifocal lenses it is desired to hold the segment or wafer of the lens in spaced relation with the lens blank during the fusing operation so that when the wafer becomes soft under the action of heat it will gradually come in contact with the lens blank and thereby force out all gases from between the under face thereof and the lens blank so that the formation of air bubbles or other imperfections in the lens is effectually prevented. The inner edge of the weight 10 is provided with an arcuately shaped recess 11 against which one edge of the segment 12 is adapted to abut to prevent lateral movement of the segment in one direction and overhanging this recess and adapted to rest upon the upper face of the segment 12 is a lip 13.

Inwardly extending pins 14 having down struck terminals are carried upon the inner edges of the bars 9 and provide an abutment for the segment 12 to act in conjunction with the recess 11 of the member 10 to prevent movement of the segment upon the lens blanks when the device is in its operative position.

In the use of the device set forth the lens blank 15 is first placed upon the support 4 in a position so that the countersink which is formed therein will be disposed adjacent the member 10 when this member is in its lowered position, as illustrated in Fig. I of the drawings, it being understood that the member 10 and bars 9 are swung out of the path of the support 4 during the placing of the blank 15 thereon. After the blank 15 with the wafer 12 resting in the countersink thereof is placed upon the support 4 the member 10 is swung downward so that the lip 13 will engage upon the upper face of the segment near the edge thereof, whereupon the opposite portion of the segment will be held in spaced relation with the blank 15, the pins 14 and recess 11 preventing any lateral movement of the segment while being held in this position, it being understood that the opposite portion of the segment is held in spaced relation with the blank 15 by reason of the weight of the member 10, and by reason of the fact that the curve upon the under face of the segment 12 is, as usual, of a shorter arc than the curve of the countersink of the lens blank.

While being held in the position set forth, the blanks are subjected to the action of heat in the ordinary manner so that the segment 12 will become fused to the blank 15.

To limit downward movement of the member 10 upon softening of the segment 12, I provide a thumb screw 16 which is threaded into the boss 3 and is vertically adjustable by turning the same in either direction. The screw 16 is positioned at a suitable point upon the base 1 so that a portion of the member 10 will rest thereon when the said member is in its lowered position. By means of this screw it will be readily seen that the downward movement of the member 10 is limited and may be varied at will.

In Figs. VII and VIII of the drawings I have illustrated slightly modified forms of means for holding the segment and preventing movement thereof with respect to the blank 15. In this form of my invention I have shown a ring 17 as being mounted between the bars 9 and as having the overhanging lip 18 which is adapted to serve the same purpose as the lip 13, the ring being adapted to encircle the segment, as will be understood.

I claim:

1. In a device of the character described, the combination with a support for the major lens blank, of a segment engaging member carried by the support and comprising a pressure portion for engaging one edge of the segment and additional positioning portions for engaging sides of the segment to insure correct positioning thereof.

2. In a device of the character described, the combination of a support for the major blank, of a segment holding member comprising a yoke having a central portion adapted to engage the upper face of a segment and lateral portions adapted to engage the edges of the segment to insure correct positioning thereof.

3. In a device of the character described, the combination with a base of a lens positioning and clamping member, pivotally secured to the base and comprising a weighted portion adapted to bear down upon the upper surface of a segment near one edge thereof to retain the segment in tilted position, an additional portion adapted to engage the edges of the segment at a point removed from the surface engaging portion to serve as guides for the segment and insure correct positioning thereof.

4. In a device of the character described, the combination with a base of a lens positioning and clamping member, pivotally secured to the base and comprising a weighted portion adapted to bear down upon the upper surface of a segment near one edge thereof to retain the segment in tilted position, an additional portion adapted to engage the edges of the segment at a point removed from the surface engaging portion to serve as guides for the segment and insure correct positioning thereof, and an adjustable stop to limit the movement of the pivoted device in the direction of the segment.

5. In a device of the character described, the combination with a base having a stop adapted to engage and position a major blank, of a segment engaging device pivoted to the base and having positioning members adapted to engage a segment at a plurality of points to retain the segment in desired position on the major blank and having a bearing portion adapted to engage the upper surface of the segment at one edge to retain the segment initially in tilted position, substantially as and for the purpose described.

6. In a device of the character described, the combination with a base having a stop for positioning a major blank, of a yoke pivoted to the base and adapted to span a segment, said yoke being provided with means for engaging the sides of a segment at a plurality of points to insure exact positioning of the segment on the blank, means on the yoke for engaging the upper surface of the segment to hold the segment in tilted position, and means for limiting the pivotal movement of the yoke in the direction of the segment.

7. A device for holding the parts of bifocal lenses during fusing thereof, including a base, a lens support, a weighted member pivoted to the base, means to lock the support to the base, and means to limit movement of the weighted member.

8. A device of the character described, comprising a base, a lens support, means to prevent movement of the support relative to the base, a weighted member pivoted to the base for engagement with the segment of the bifocal lens, and means on said member for engagement with the edge and one face of the segment.

9. A device of the character set forth, comprising a base, a lens support shaped to the contour of the lens, a set screw for locking the support to the base, uprights carried by the base, a member pivoted to said uprights and adapted to be swung into engagement with the segment of the lens, a set screw for limiting the swinging movement of the member in one direction, and pins carried by the member for preventing lateral movement of the segment.

In testimony whereof I affix my signature in presence of two witnesses.

HARRY W. HILL.

Witnesses:
 CARROLL BAILEY,
 EDITH M. HALVORSEN.